June 27, 1967

F. M. WOOD 3,328,681

ELECTROMAGNETIC FLAW DETECTION APPARATUS
WITH VELOCITY COMPENSATION

Filed March 14, 1966

INVENTOR.
Fenton M. Wood
BY Arnold and Roylance
ATTORNEY

June 27, 1967  F. M. WOOD  3,328,681
ELECTROMAGNETIC FLAW DETECTION APPARATUS
WITH VELOCITY COMPENSATION
Filed March 14, 1966  3 Sheets-Sheet 2

INVENTOR.
Fenton M. Wood
BY Arnold and Roylance
ATTORNEY

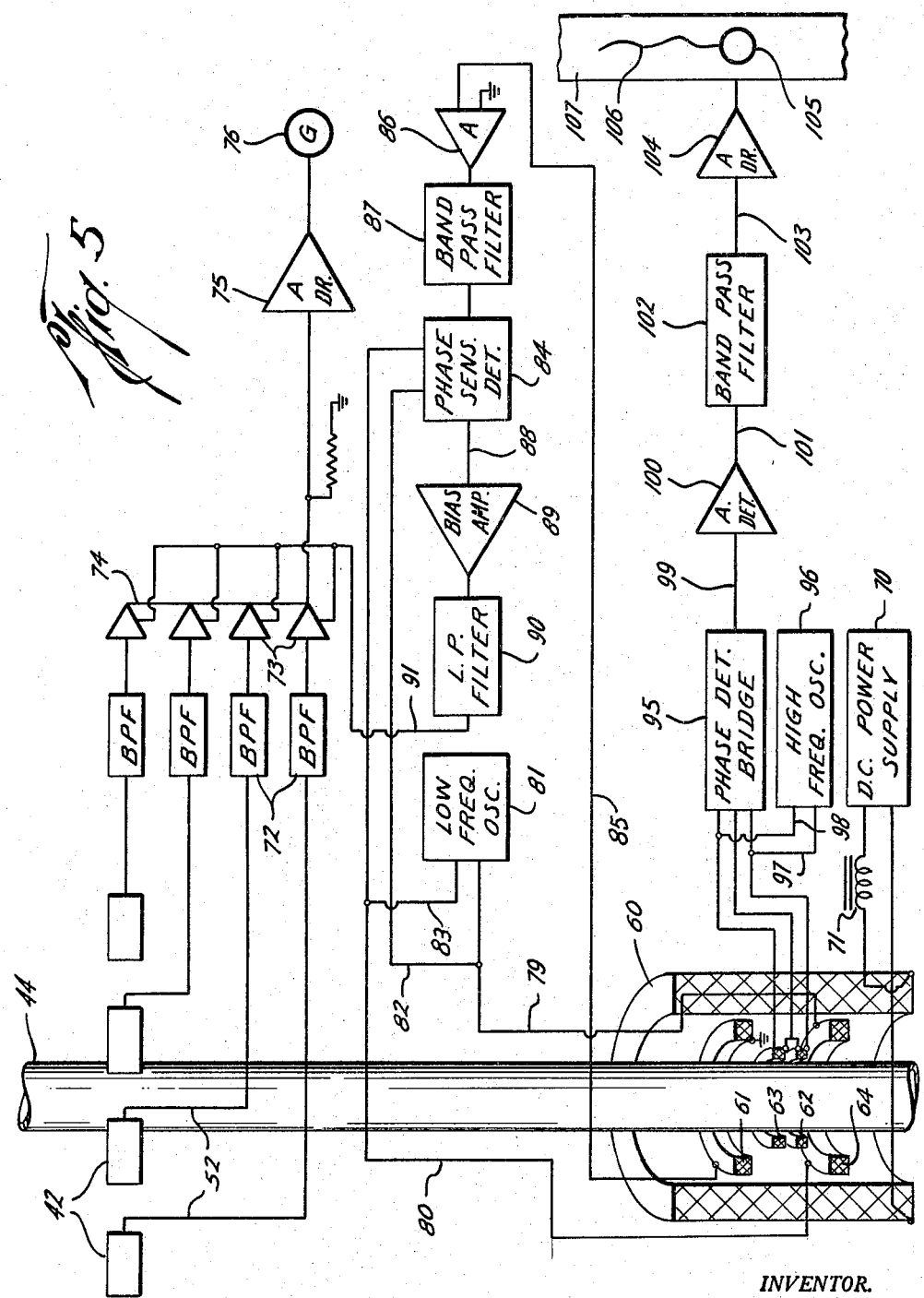

United States Patent Office 3,328,681
Patented June 27, 1967

3,328,681
ELECTROMAGNETIC FLOW DETECTION APPARATUS WITH VELOCITY COMPENSATION
Fenton M. Wood, Sugarland, Tex., assignor to American Machine & Foundry Company, New York, N.Y., a corporation of New Jersey
Filed Mar. 14, 1966, Ser. No. 541,886
4 Claims. (Cl. 324—37)

This is a continuation-in-part application of my copending patent application Ser. No. 119,178 entitled, Electromagnetic Inspection Device filed June 23, 1961, now abandoned.

This invention relates to means for electromagnetic inspection of elongated objects, particularly drill pipe as it is withdrawn from the well.

Previous electromagnetic inspection devices of this type have had excessive air gaps between the surface of the test pipe and the search coils due to the necessity of providing ample space through the coils for the passage of the tool joint couplings. Such devices, due to the excessive air gap, do not have adequate resolving power for locating small fatigue cracks which may have an axial dimension of less than .001 inch.

In a previous patent to Price et al. No. 2,882,488, there is disclosed means for overcoming this difficulty by mounting the search coils in shoes which ride on the surface of the test pipe and which can yield laterally to pass coupling enlargements. However, the rather complicated system of rollers, cams, levers, pins, screws, and springs used to resiliently position the shoes is subject to rather serious disadvantages. For one thing, when tool joints are unscrewed above the search mechanism, quantities of hot drilling mud may drip into the mechanism. This mud, which often has chemical additives, dries rapidly in the mechanism causing malfunctioning which may permit the shoes to jam away from the pipe surface. Furthermore, if a piece of this equipment, such as a case-hardened cam follower which is not drillable, comes loose and falls down the hole, it must be fished out, an expensive and time consuming operation, before drilling can continue. Finally, the large and massive mechanism is mounted above the rotary platform upon air cylinders which are necessary for elevating the mechanism from time to time to facilitate manipulation of the slips.

Consequently, an object of the present invention is to provide novel apparatus of the above type with means for maintaining the pick-up coils in close proximity to the surface of the test pipe without the use of separate mechanical elements which may fall into the hole.

Another object is to provide novel, simplified means for magnetic inspection of drill pipe with simplified, non-mechanical means for correcting the test signal as the velocity of the pipe through the apparatus changes.

Another object is to provide improved means for testing drill pipe for wear.

Another object is to provide an inspection device for drill pipe and the like in which all moving parts, including search shoes, are made of drillable material so as to avoid the necessity of a fishing operation in case such part should fall into the wall.

Another object is to provide an inspection device of the above type which will reliably sense cracks as well as wear in the object being inspected.

Still another object is to provide test apparatus of the above type which is sufficiently light and compact to be handled by one man.

These objects and other more detailed objects hereafter appearing are attained substantially by the herein-disclosed apparatus which consists, generally, of a flat cylindrical housing which, preferably, is mounted between the derrick floor and the blow-out preventer. Within the housing there are provided a plurality of coaxial exciting coils which in operation are energized, respectively, by direct current and two voltages of different frequencies. A path for the drill pipe is provided axially through the housing and coils and projecting into this path are a pair of generally frusto-conical, resilient collar devices which mount circumferential shoes carrying search coils and which ride upon the surface of the pipe. These collars may stretch and flex as necessary to accommodate tool joint enlargements as well as the usual swaying and lurching of the drill pipe during withdrawal from the well.

In the accompanying drawings which illustrate the invention,

FIG. 5 is a wiring diagram showing the control circuits.

Figure 1:
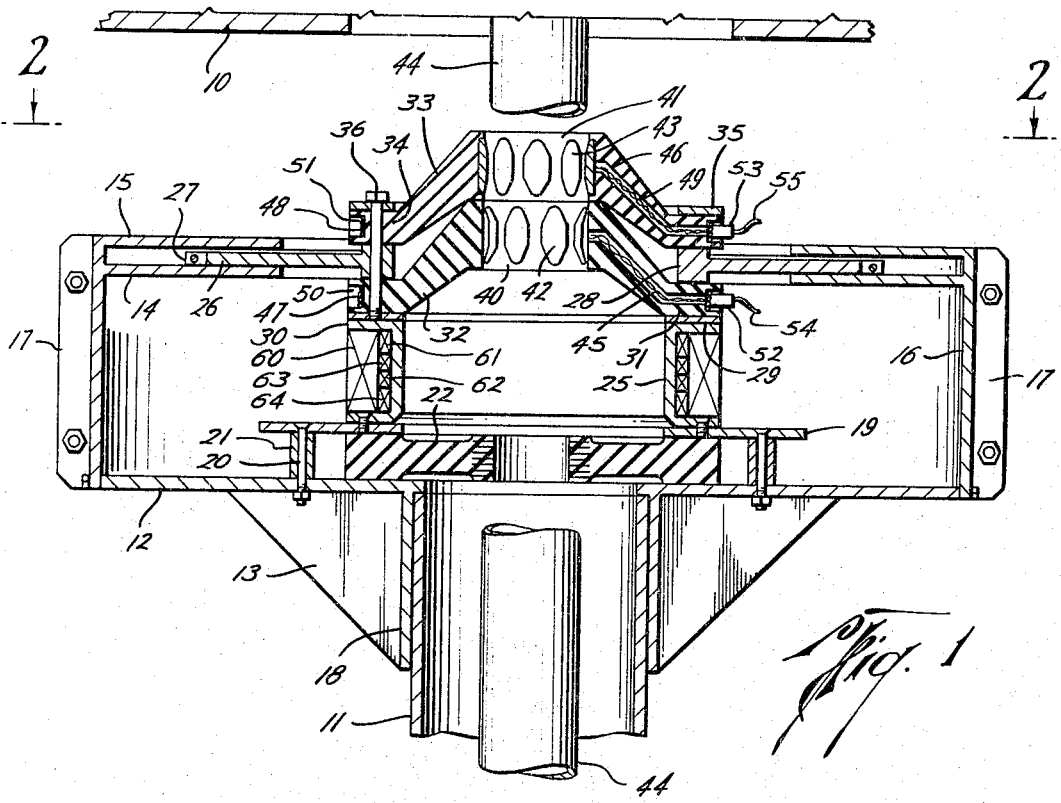
FIG. 1 is a vertical, transverse center section of the novel inspection equipment.
Figure 3:
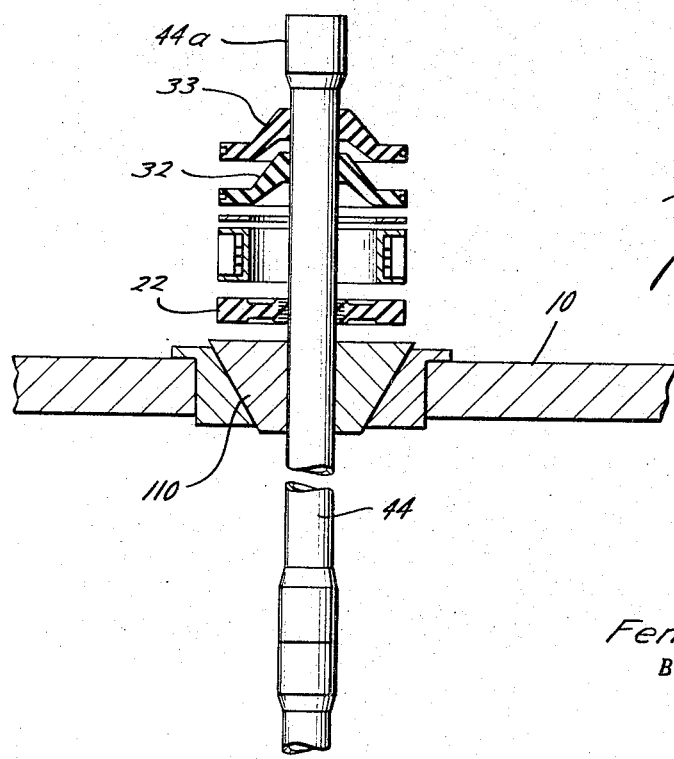
FIGS. 3 and 4 are schematic representations showing the steps in assemblying the equipment on a drill pipe for inspection thereof.
Figure 2:
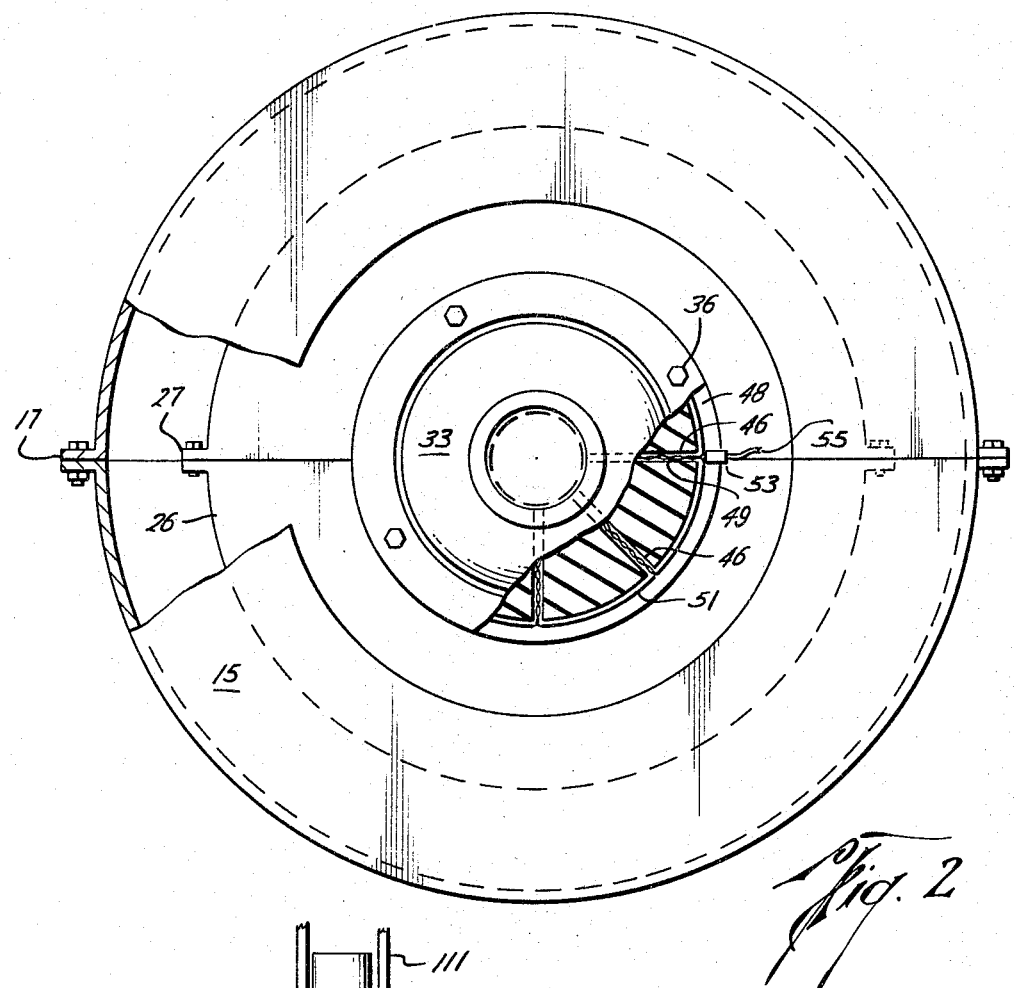
FIG. 2 is a top view of the structure in FIG. 1, parts being broken away and sectioned.

In the drawings there is shown at 10 a derrick floor upon which is mounted the usual rotary table and other equipment (not shown). Extending upwardly from the bore hole beneath the derrick floor is a tubular nipple 11 which may extend above a blow-out preventer. On top of member 11 there is provided a housing including bottom wall 12 with bracing gussets 13, double top wall 14, 15, and cylindrical side wall 16. The housing is diametrically split and provided with bolting flanges 17. Bottom wall 12 is secured to member 11 by means of a cup 18 against which gussets 13 terminate. A platform 19 is mounted above bottom wall or floor 12 by means of bolts 20 and spacers 21 received upon securing bolts 20. The platform secures in axial position a wiper ring 22, conveniently of rubber. Both bottom wall 12 with mounting cup 18 and platform 19 may be diametrically split to facilitate application to the drill string below the derrick floor. A coil form spool 25 is mounted upon platform 19, coaxially with nipple 11 and bolted to the platform. A pressure plate 29 rests on spool top flange 30. A split ring 26 having diametral bolting flanges 27 is radially slidable in the space between casing walls 14 and 15 and held thereby against axial movement. An annular flange 28 extends around the inner edge of ring 26. Platform 19, spool 25, plate 29, and ring 26 have ample central apertures in alignment with support nipple 11.

Received between pressure plate 29 and inner flange 28 on ring 26 is the flange 31 of a generally frusto-conical rubber collar member 32. A second, identical rubber collar member 33 has a bottom flange 34 which rests upon ring flange 28. An upper pressure plate 35 rests upon flange 34 and bolts 36 extend through the dual collar assembly including the top pressure plate 35 and are threaded into bottom pressure plate 29. The arrangement is such that the collar assembly can bodily shift radially, ring 26 moving within the space between casing top walls 14 and 15 to permit this.

The inner annular faces 40 and 41 of these collar devices, initially, are axially aligned with support nipple 11 and circumferential series of shoes 42 and 43 are mounted in these faces, preferably by molding. The shoes are presented so as to bear against the surface of the drill pipe being passed therethrough and are staggered, as shown, so as to cover substantially the entire surface of the pipe. Portions of a test pipe, broken away to better show the inspection equipment, are shown at 44. Each collar device has radial, inclined passages, as 45 or 46, one for each shoe and each extending from its shoe to the anular recess 47 or 48. Received in each of the shoes 42 and 43 is a suitable search or detector coil, and each such coil is provided with a lead wire, as 49, extending through one of the radial passages 45 or 46. All of these wires extend, as at 50 or 51, around the recess 47 or 48 and terminate in a connected fitting 52 or 53 for connection by cables 54 or 55 to signal processing equipment, as will be described.

Mounted within the housing formed by walls 12, 14 and 16 are a main magnetizing coil 60 and four inner coils 61, 62, 63 and 64. These coils are all formed upon the spool 25 and are provided with suitable connection terminals not shown. Coils 61 and 64 function as part of the velocity effect correction apparatus, while coils 62 and 63 are used in sensing wear in the test pipe, i.e., thickness variation, as will be explained. It is contemplated that all of the coils 60–64 may be of split construction so as to be assembled radially about a test pipe, as will be explained. A means for achieving this result is disclosed in Vogt Patent 2,895,103. However, in many installations, these parts may be inserted through the rotary table permanently mounted in its inspection position. In such cases the coils and other casing parts need not be split.

With reference to the wiring diagram shown in FIG. 5, the main magnetizing coil 60 is energized from a DC power supply 70, the magnitude of which is sufficient to saturate the pipe sample passing through the coil. A choke coil 71 is inserted in the supply circuit to maintain a high reactance path to currents in the frequency range of the eddy current equipment used. The circumferential series of search coil supporting shoes 42 are each connected by a wire 52 to a band pass filter 72 and an amplifier 73 in series. All of the amplifiers 73 are connected by a common wire 74 to a driver amplifier 75 and thence to a galvanometer 76 for display.

Since the velocity of the test pipe 44 in being removed from the well will be slow at first and will gradually increase as pipe is removed from the well, a velocity effect correction in the signalling circuitry must be provided. This is because the flaw signal voltage generated in the search coils will be a function of the pipe velocity. To overcome this problem, an automatic gain control system is employed including the coil 64, which is excited through wires 79 and 80 by a low frequency oscillator 81 which impresses on the coil oscillations conveniently on the order of five cycles per second. This coil sets up eddy currents in the test pipe which, in turn, induce a voltage in the coil 61 spaced longitudinally of the test pipe from coil 64. The phase relationship between the voltage impressed on coil 64 and that induced in coil 61 will be a function of the velocity of the test pipe through the inspection unit. The impressed frequency is applied through wires 82 and 83 to a phase balance sensing detector 84. The induced oscillations in coil 61 are applied through wire 85, an amplifier 86, and a band pass filter 87, also, to phase balance sensing detector 84. When the oscillations in coils 61 and 64 are out of phase due to movement of the test pipe through the apparatus, a bias voltage will be generated in proportion to the velocity of the test pipe, and this voltage is applied through a wire 88, amplifier 89, filter 90 and wire 91 to the grids of channel amplifiers 73 in such a manner as to bias the amplifiers so that the gain of each varies inversely as the velocity of the test pipe. This corrects the flaw detection signals so as to eliminate the effect of test pipe velocity thereon.

Coils 62 and 63 constitute part of the wear detection circuitry. These coils make up two legs of a phase detector bridge, schematically represented at 95. A high frequency oscillator 96 impresses on each of the coils 62 and 63, through wires 97 and 98, a high frequency current, on the order of 60 to 400 cycles per second. The amplitude and phase of the voltage across each individual coil is modified in accordance with the relative thicknesses of the test pipe portions centered within the coils so as to unbalance bridge 95. Such unbalance creates an output voltage proportional to the unbalance of bridge 95 which is delivered through wire 99 to an amplifier and rectifying device 100, the output of which is led through wire 101 to a band pass filter 102 which filters out the carrier frequency and transmits the low frequency wall variation signal through a wire 103 and an amplifier-driver 104 to a recording galvanometer 105 which applies a visible record 106 to the strip chart 107.

As previously stated, the test equipment is conveniently applied in the out-of-the-way position beneath the derrick floor upon the support nipple 11 which projects above the blowout preventer. In order to install the test equipment prior to withdrawal of a drill string from the well, the string is supported in the slips 110 and unscrewed at the joint 44a. Wiper 22, lower pressure plate 29, rubber collars 32 and 33, and top pressure plate 35 are then applied over the end of the string, the wiper and collars stretching to permit this. The wiper is then pushed down against previously mounted casing bottom wall 12 and platform 19 applied and bolted to the bottom wall. Next, the coil form and coils are applied about the string above the platform and secured in position. As previously indicated, if the form spool is in one piece, it may be applied over the projecting end of the string in advance of the collar assembly and dropped down through the rotary table upon plate 19. The collars are then pushed through the rotary table against the coil form and split ring 26 applied between the rubber collars. After the cable and coil electrical connections are made, the parts of split casing 16, 14, and 15 are placed about the parts and bolted.

The shoes 42 and 43 are disposed in staggered relationship so that the carried search coils will sweep substantially the entire surface area of the pipe. During withdrawal, the pipe customarily sways and lurches but both the collars and the wiper are free to shift laterally relative to the casing so these members will remain substantially coaxial with the pipe. However, wall 12 and platform 19 and ring 26 effectively prevent the wiper and collars from moving axially with the test pipe. While the exact centering of the magnetizing coils with respect to the test pipe is not critical, it would be possible to resiliently center coil spool 25 within the housing, particularly where this spool is of less diameter than joint end 44a, so as to reduce the air gap between these coils and the pipe surface.

Figure 4:
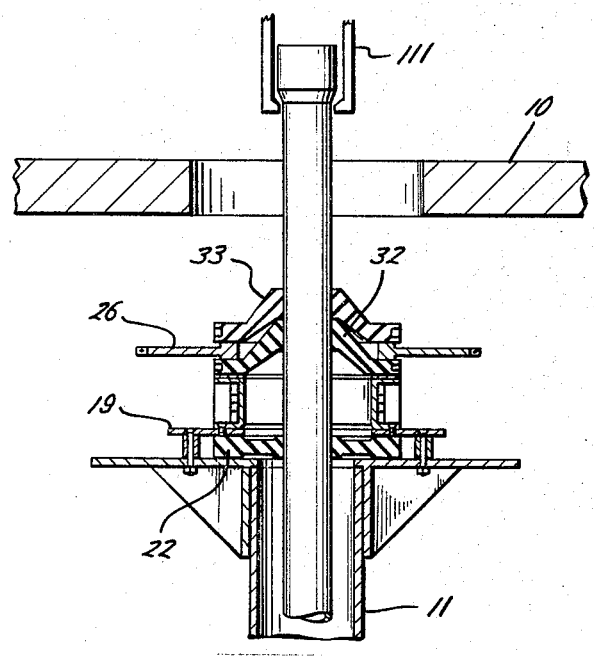

In removing the test apparatus after the test string is withdrawn from the well, the assembly procedure described is reversed, flange 17 and casing walls 16, 14, and 15 and coils 60–64 are first removed after cables 54 and 55 are disconnected. Then split platform 19 and ring 26 are unbolted and removed. The last drill collar and bit are then drawn upwardly through the vacant rotary table 111 (FIG. 4) pulling with it wiper 22 and collars 32 and 33. Finally, the bit is unscrewed and flexible wiper 22 and collars 32 and 33 with the pressure plates are pulled off the bottom end of the drill collar.

The use of the test equipment, as described, not only clears the derrick platform to facilitate access to the slips and rotary table, but also completely eliminates previously used mechanical mechanisms which were subject to fouling and clogging as well as dropping into the well, thus necessitating costly repair and/or fishing operations and delaying resumption of drilling. Moreover, the apparatus, due to its unique instrumentation, is exceptionally accurate in locating flaws, even minute fatigue cracks, as well as pitting and wear in the pipe wall to an extent not heretofore possible.

The rubber collars 32 and 33 may be constructed as segments, instead of each integrally, with one or more shoes in each segment. All of such segments may be united in an integral peripheral flange or secured in the assembled, conical form by the pressure plates to form, in effect, a segmented rubber collar.

The invention may be modified in various respects as will occur to those skilled in the art and the exclusive use of all modifications as come within the scope of the appended claims is contemplated.

I claim:
1. An apparatus for detecting flaws in a pipe, comprising:
   D-C magnetizing means disposed adjacent the exterior surface of the pipe for inducing therein a saturating D-C flux field,
   means for effecting relative movement between the pipe and said D-C magnetizing means,
   D-C magnetic-responsive means disposed adjacent the pipe and spaced axially from said D-C magnetizing means in the direction of said movement for sensing the strength of the flux leakage from said induced field caused by flaws and producing a first voltage also inherently responsive to the velocity of said relative movement,
   indicator means including an amplifier connected to said D-C magnetic-responsive means for indicating changes in voltage as indications of flaws in the pipe,
   low frequency magnetizing means disposed adjacent the D-C flux saturated exterior surface of the pipe for inducing low frequency, longitudinal eddy currents therein,
   eddy current responsive means disposed adjacent the exterior surface of the pipe and spaced axially from said low frequency magnetizing means for sensing the induced eddy currents as they pass there opposite, the travel time of said currents being partly a function of the velocity of the pipe,
   phase detection means connected to receive the output from said low frequency magnetizing means and the output from said eddy current responsive means for producing a second voltage that is a function of the phase therebetween, said phase being a function of the velocity of said relative movement,
      said second voltage connected to said amplifier of said indicator means for controlling the gain thereof to compensate for the effects of velocity changes on said first voltage by varying said first voltage inversely with the velocity of said relative movement.

2. An apparatus for detecting flaws in a pipe, comprising:
   a D-C magnetizing coil disposed adjacent the exterior surface of the pipe for inducing therein a saturating D-C flux field,
   means for effecting relative movement between said pipe and said D-C magnetizing coil,
   D-C magnetic-responsive means disposed adjacent the pipe and spaced axially from said D-C magnetizing coil in the direction of said movement for sensing the strength of the flux leakage from said induced field caused by flaws and producing a first voltage also inherently responsive to the velocity of said relative movement,
   indicator means including an amplifier connected to said D-C magnetic-responsive means for indicating changes in voltage as indications of flaws in the pipe,
   low frequency magnetizing means including a coil disposed adjacent the exterior surface of the pipe, said coil being within the axial limits of said D-C magnetizing coil, for including low frequency, longitudinal eddy currents therein.
   eddy current responsive means including a coil disposed adjacent the exterior surface of the pipe and spaced axially from the coil of said low frequency magnetizing means, said coil of said eddy current responsive means being within the axial limits of said D-C magnetizing coil, for sensing the induced eddy currents as they pass thereopposite, the travel time of said currents being partly a function of the velocity of the pipe,
   phase detection means connected to receive the output from said low frequency magnetizing means and the output from said eddy current responsive means for producing a second voltage that is a function of the phase therebetween, said phase being a function of the velocity of said relative movement,
      said second voltage connected to said amplifier of said indicator means for controlling the gain thereof to compensate for the effects of velocity changes on said first voltage by varying said first voltage inversely with the velocity of said relative movement.

3. An apparatus as described in claim 2, and including:
   high frequency magnetizing means including first and second coils surrounding the pipe, said coils being spaced axially apart and within the axial limits of said D-C magnetizing coil.
      said first and second coils being connected in a bridge circuit such that a relative difference in wall thickness of the pipe opposite said first and second coils results in an electrical unbalance of said bridge, thereby resulting in a third voltage,
   second indicator means receiving said third voltage for indicating variations in wall thickness of the pipe.

4. An apparatus as described in claim 3, wherein,
   said bridge circuit is a phase detector responsive to the difference in the phases of the voltages induced in said first and second coils for producing said third voltage,
and including,
   high frequency filtering means connected to the output of said bridge circuit for allowing said second indicator means to receive said third voltage substantially free of high frequencies.

References Cited

UNITED STATES PATENTS

| | | | |
|---|---|---|---|
| 2,488,277 | 11/1949 | Falk et al. | 324—34 |
| 2,582,437 | 1/1952 | Jezewski et al. | 324—34 |
| 2,706,805 | 4/1955 | Clewell | 324—40 |
| 2,786,978 | 3/1957 | Warner | 324—70 |
| 2,882,488 | 4/1959 | Price et al. | 324—37 |

FOREIGN PATENTS 766,353  1/1957  Great Britain.

OTHER REFERENCES

Graneau, P.: The Effect of Sample Movement in Fault Detection Using Eddy Currents, The Institute of Electrical Engineers, Paper No. 2945M, July 1959.

RUDOLPH V. ROLINEC, *Primary Examiner.*

WALTER L. CARLSON, *Examiner.*

R. J. CORCORAN, *Assistant Examiner.*